B. F. & J. W. LEWIS.
PUSHER ATTACHMENT FOR HAY RAKES.
APPLICATION FILED FEB. 6, 1912.
1,038,163.
Patented Sept. 10, 1912.
2 SHEETS—SHEET 2.
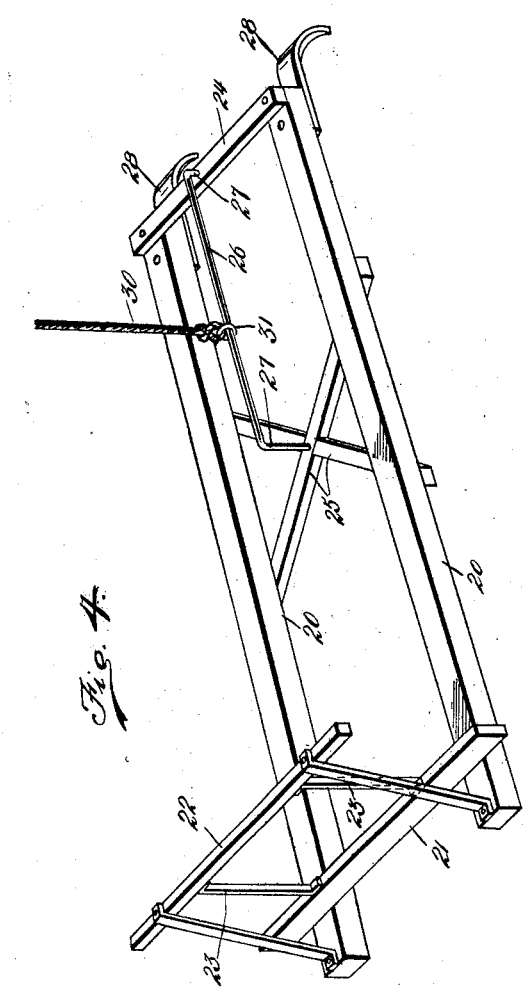
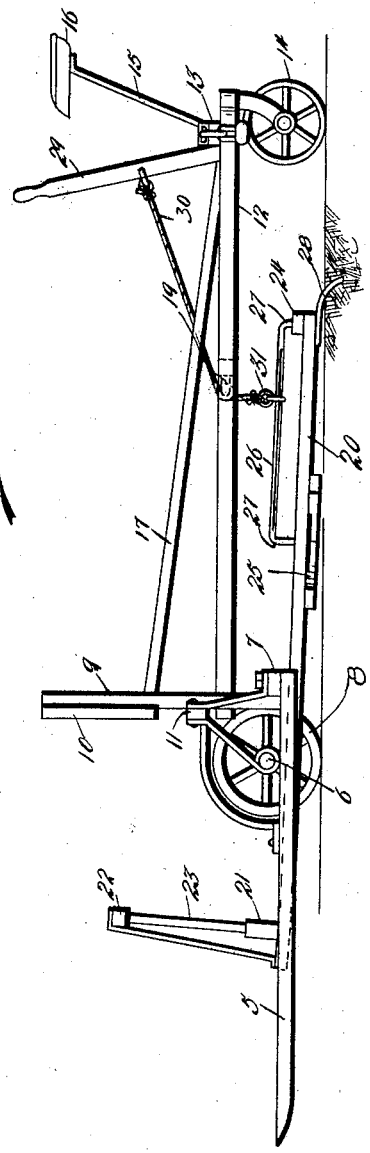
Witnesses
Inventors
B. F. Lewis.
J. W. Lewis.
By
Attorneys

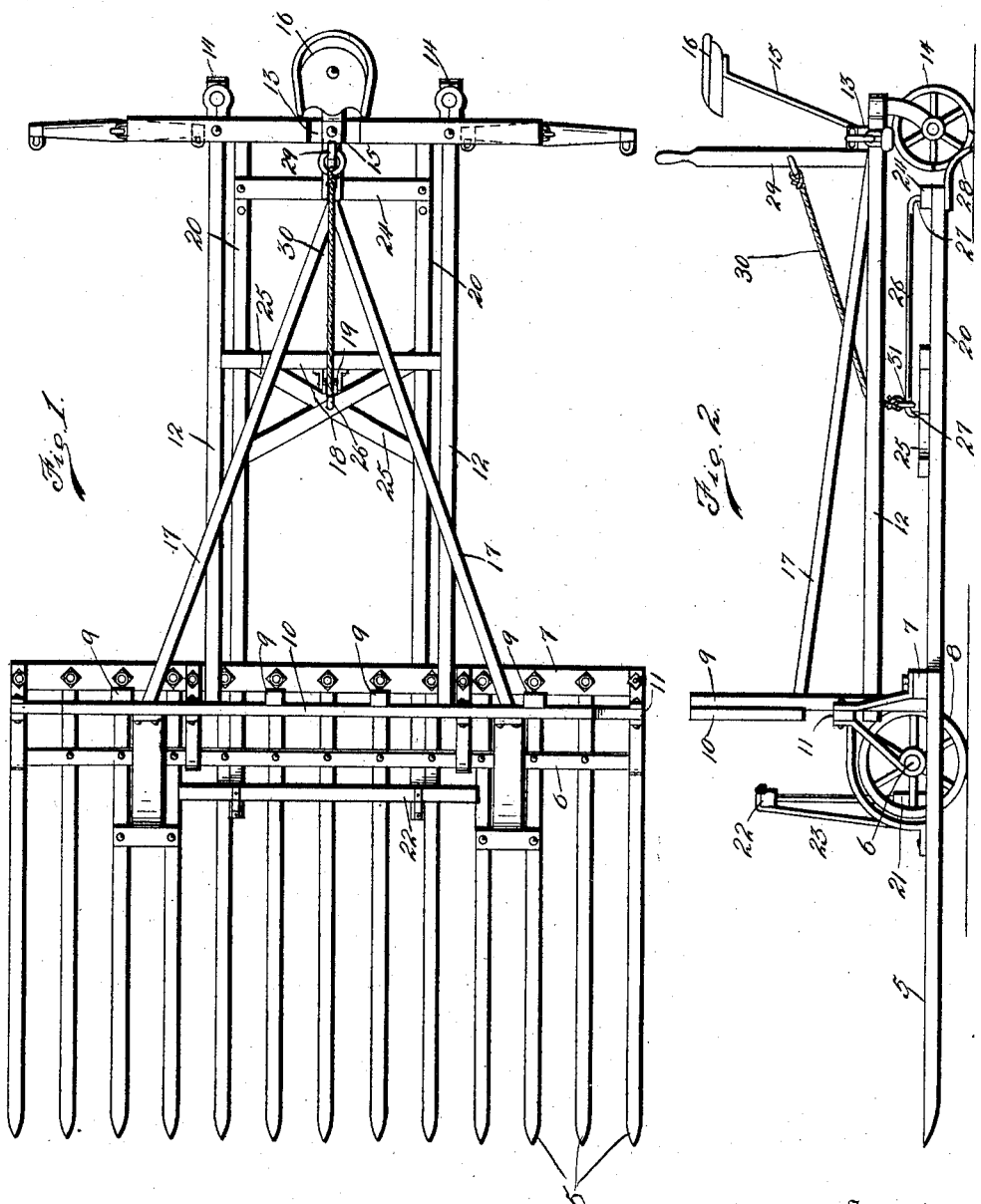

UNITED STATES PATENT OFFICE.

BENJAMIN F. LEWIS AND JOHN W. LEWIS, OF HARTLAND, KANSAS.

PUSHER ATTACHMENT FOR HAY-RAKES.

1,038,163.　　　　　Specification of Letters Patent.　　Patented Sept. 10, 1912.

Application filed February 6, 1912. Serial No. 675,713.

*To all whom it may concern:*

Be it known that we, BENJAMIN F. LEWIS and JOHN W. LEWIS, citizens of the United States, residing at Hartland, in the county of Kearny, State of Kansas, have invented certain new and useful Improvements in Pusher Attachments for Hay-Rakes; and we do hereby declare the following to be a full, clear, and exact description of the invention, such as will enable others skilled in the art to which it appertains to make and use the same.

This invention relates to a pusher attachment for hay sweeps.

The sweep as originally constructed, in depositing a load of hay on the stacker, is liable to withdraw a part of the load when the scraper is removed from the stacker.

The principal object of the invention is therefore to provide a pusher attachment for hay sweeps which will effect the proper deposit of a load of hay from the sweep onto the stacker, and prevent said load from being pulled from the stack when the sweep rake is withdrawn.

Another object of the invention is to provide an attachment for the purpose described which is composed of a minimum number of parts, is therefore simple in construction, is capable of attachment to any sweep rake now in general use, and is cheap to manufacture.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction within the scope of the claim, may be resorted to without departing from the spirit or sacrificing any of the advantages of the invention.

In the drawings: Figure 1 is a top plan view of a sweep rake showing our pusher attachment applied thereto, Fig. 2 is a side elevation showing the attachment in one of its extreme positions, Fig. 3 is a similar view but showing the attachment in its intermediate position, and Fig. 4 is a perspective view of the attachment.

Like reference numerals designate corresponding parts in all the figures of the drawings.

Referring to the drawings, the rake head is constructed of tines 5 secured upon and are connected by a plurality of cross bars 6 and 7, the forward one of which constitutes an axle upon which supporting wheels 8 are mounted. Secured upon the cross bar 7 are uprights 9—9, which are connected at their upper extremities by a cross bar 10 and below the latter by an intermediate cross bar 11. Extending rearwardly from the rake head and connected thereto is the main frame, which is composed of side members 12—12 which are connected and spaced apart by a cross bar 13. The rear end of the frame is supported by suitable ground wheels 14—14, and extending upwardly from the rear end of the frame is the usual seat standard 15 carrying the seat 16. Extending forwardly from the central portion of the rear cross bar 13 are upwardly inclined diverging frame members 17—17, the forward ends thereof being connected to the cross bar 10. A transverse frame member 18 centrally connects the frame members 17, and centrally carried by this member is a pulley 19.

The invention comprises a hay pusher attachment consisting of a frame which comprises longitudinal members 20—20 to which is connected at one end a transverse bar 21. A second transverse bar 22 is spaced from the bar 21 by means of vertical guide rods 23, the bars and the rods together forming a pusher head for the rake. The ends of the members 20 opposite the head are connected by a transverse member 24. Cross braces 25 centrally connect the members 20, and connecting the braces 25 at their junctures and the bar 24 is a longitudinally disposed guide rod 26. This rod is preferably formed in U-shaped formation, the legs 27—27 being very short and connected to the braces 24 and 25, and the connecting portion being of considerable length. Secured to the rear ends of the frame members 20 by any suitable means are rearwardly and downwardly projecting earth-engaging teeth 28—28. This attachment is positioned upon the main frame of the rake so that the head is disposed above and adapted to ride upon the tines of the rake, the frame of the attachment being disposed directly under the main frame of the machine. A hand lever 29 is fulcrumed on the main frame of the machine adjacent the operator's seat 16. A rope 30 is connected at one end to the hand lever 29, and this rope is trained over the pulley 19, and is provided at its other end with a ring 31, which ring has slidable engagement with the rod 26.

In operation, when the machine is drawn along the ground hay is picked up upon the tines of the fork and this hay is shoved up against the transverse bars 21 and 22 of the pusher head. During this operation, the lever is disposed in its upright position and the rope 30 is of such a length as to hold the teeth 28 above the ground, yet permitting of a rod 26 to slide through the ring 31. When, however, it is desired to remove the hay from the rake head, the hand lever 29 is moved forwardly, thereby permitting the chain 30 to ride over the pulley 19 and consequently permit the teeth 28 to engage the ground. The hay pusher attachment is thereby held against movement, and in order to push the hay from the rake, the main frame is moved rearwardly, as will be readily understood.

What is claimed is:

The combination with a hay gatherer including a main frame and a rake head, of a pulley supported by the main frame, a hand-lever fulcrumed on said main frame, a hay pusher slidably mounted on the rake head, a frame connected to the pusher and disposed below the main frame, earth-engaging teeth carried by the pusher frame, a longitudinal rod connected to the pusher frame, a ring slidably mounted on the rod, and a chain trained over the pulley and connecting the lever and the ring for raising and lowering the pusher frame.

In testimony whereof, we affix our signatures, in presence of two witnesses.

BENJAMIN F. LEWIS.
JOHN W. LEWIS.

Witnesses:
THOMAS E. BAUGH,
JAMES L. HILLYARD.

---

Copies of this patent may be obtained for five cents each, by addressing the "Commissioner of Patents, Washington, D. C."